United States Patent Office 3,025,140
Patented Mar. 13, 1962

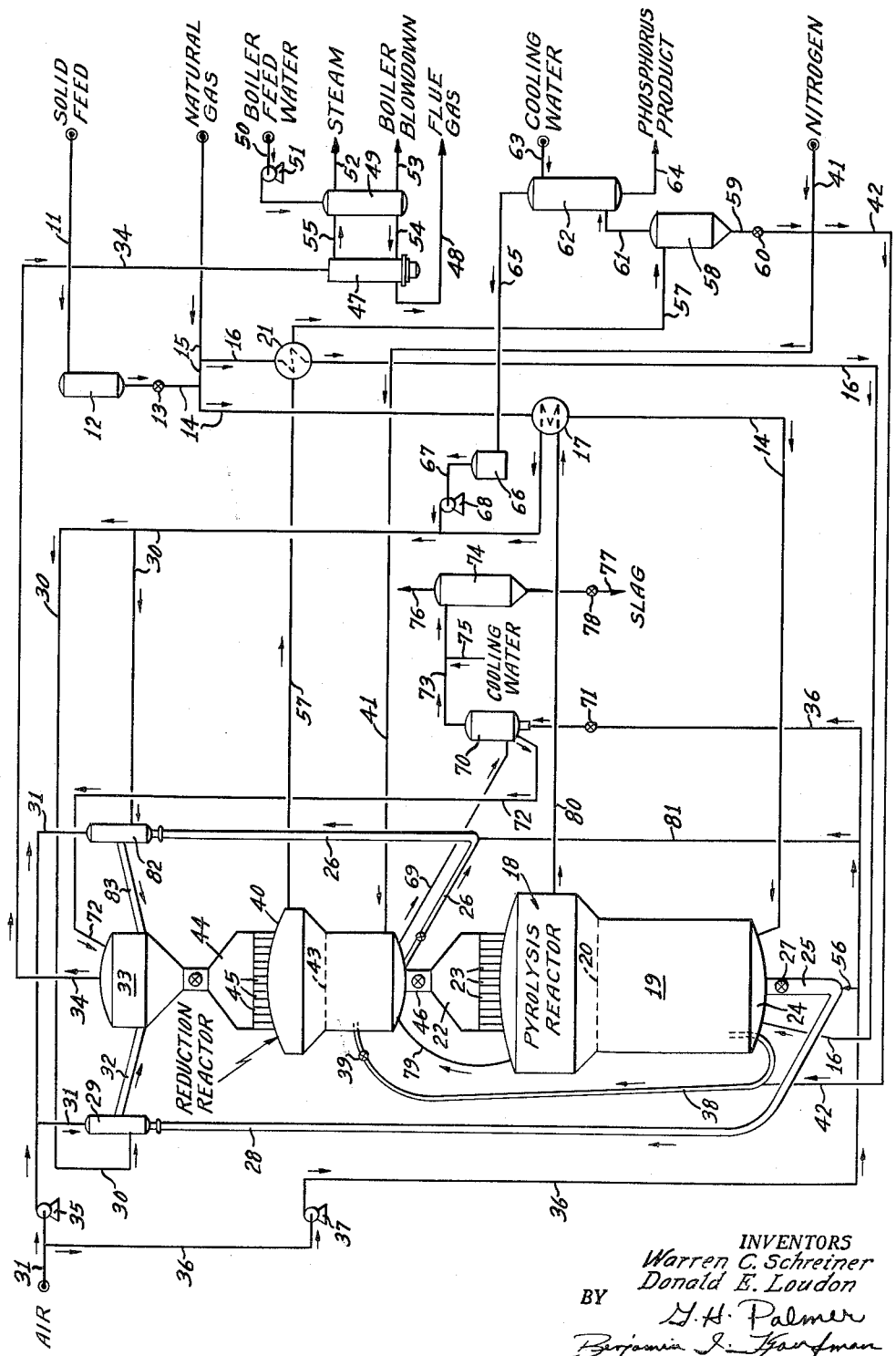

3,025,140
PHOSPHORUS PRODUCTION
Warren C. Schreiner, East Norwich, and Donald E. Loudon, New York, N.Y., assignors to The M. W. Kellogg Company, Jersey City, N.J., a corporation of Delaware
Filed July 28, 1960, Ser. No. 45,929
13 Claims. (Cl. 23—223)

This invention relates to the production of phosphorus and more particularly, to the production of phosphorus or phosphoric acid from phosphatic materials. Still more particularly, the invention relates to the production of elemental phosphorus, and subsequently phosphoric acid, from phosphate rock by a novel method of pyrolysis and reduction treatments.

This invention is a continuation-in-part of our prior and co-pending application Serial No. 600,287, filed July 26, 1956, and a continuation-in-part of our prior and co-pending application Serial No. 855,785, filed November 27, 1959.

Prior to our invention, elemental phosphorus was produced commercially by two principal processes. In the so-called "wet process," phosphate rock is digested with sulfuric acid to produce a solution of phosphoric acid containing a suspension of finely divided calcium sulfate. This solution is filtered and then concentrated by evaporation to provide the desired concentration of phosphoric acid. It has been found, however, that the acid produced in this manner is not suitable in instances in which phosphoric acid of a high degree of purity is desired, since it usually contains varying quantities of deleterious impurities, particularly calcium sulfate. These impurities are especially troublesome where the phosphoric acid is used in commercial liquid fertilizers, inasmuch as they tend to form deposits in the nozzles employed for applying the fertilizer. Thus, because of the difficulty encountered in purifying phosphoric acid produced by the "wet process" for use in liquid fertilizers or other commercial applications, acid produced by this process is seldom employed for the above purposes.

Another commercial method for the production of phosphoric acid resides in the use of the electric furnace which provides a means for producing elemental phosphorus of an improved degree of purity. In the electric furnace process, elemental phosphorus is produced by the reduction of phosphate rock with metallurgical coke in an electric furnace. Phosphorus thus produced is separated from the furnace gases by condensation, and is then burned to produce phosphorus pentoxide which is hydrated to phosphoric acid. While phosphoric acid produced by the electric furnace process is of improved purity for such purposes as the preparation of liquid fertilizers and for incorporation in various food products, it nevertheless has the disadvantage of being extremely expensive to produce by the aforementioned method because of the large quantities of electric power which are required to operate the furnace.

Another method that has been suggested for the production of phosphorus is one in which the phosphate rock is first sintered to make it porous in nature so that it might lend itself to an impregnation treatment for the deposition of carbon thereon. Thereafter, the phosphate rock is coated by cracking a hydrocarbon in its presence, and then, the phosphate material is heated in order to reduce it to elemental phosphorus. In this process, a fixed bed operation is employed. The difficulty encountered in carrying out this method, however, resides in the fact that there is obtained a coalescence or sticking of the phosphate rock particles in both the cracking or pyrolysis zone and also in the subsequent reduction zone. This coalescence of the phosphate rock particles results in the inability to obtain a substantially complete carbon coating of the rock particles so that they may be subsequently effectively reduced. Furthermore, the subsequent coalescence in the reduction zone also renders it impossible to carry out the substantially complete reduction of the coated phosphate rock to produce elemental phosphorus in a high yield. Hence, prior to our invention, no satisfactory method has been obtained for the efficient and economic production of elemental phosphorus from phosphate rock or from phosphatic materials.

It is, therefore, an object of this invention to provide an improved process for the production of phosphorus.

Another object of the invention is to provide an improved process for the production of elemental phosphorus from phosphate rock or other phosphatic materials.

Still another object of the invention is to provide an improved process for the production of elemental phosphorus, and subsequently phosphoric acid, in an efficient and economical manner and in a high yield.

Other objects and advantages inherent in the invention will become apparent to those skilled in the art from the accompanying description and disclosure.

In accordance with the present invention, a novel process has been provided for the production of phosphorus, as more fully hereinafter discussed, which comprises, in general, a two-stage method of applying a fluidized technique to effectively deposit carbon on the phosphate rock particles in such manner that there is obtained no coalescence of these particles, or a reduction of the rock in a cracking or pyrolysis zone; and thereafter heating the thus formed rock particles in a reduction zone at substantially high temperatures at which the phosphate rock particles would otherwise coalesce but for the coating thereon, to effect a reduction of the phosphate rock, with the production of elemental phosphorus, as a product of the process. In the aforementioned step, preheated inert solids are introduced into the reduction zone to come into contact with the fluidized mass of coated phosphate rock particles to maintain these coated particles at the desired temperature which is effective to reduce the coated particles and to produce elemental phosphorus as a product of the process. Following the aforementioned reduction treatment, the inert solids, now reduced in temperature, are separated from the phosphorus product and are introduced into the cracking or pyrolysis zone to come into contact with a fresh fluidized mass of phosphate rock particles to maintain this mass at the desired temperature (which is lower than the temperatures maintained in the reduction zone) and which is effective to cause cracking of fluidized hydrocarbon present, with deposition of carbon on the phosphate rock. Phosphate rock thus coated is then separated from the inert solids and transferred to the reduction zone. The separated inert solids are then reheated and also returned to the reduction zone for re-use in this zone, as described above.

Specifically, the above results are obtained by flowing a fluid hydrocarbon through a cracking zone which contains a mass of finely divided phosphate rock particles in order to maintain these particles in a fluidized condition. Heated inert solids removed from the reduction zone, as indicated above, are then transferred into the cracking zone to be brought into intimate contact with the fluidized mass of phosphate rock particles to maintain this fluidized mass at a temperature which is effective to cause cracking of the fluid hydrocarbon with the deposition of carbon on the rock particles, but below temperatures at which these particles would coalesce and at which they would be reduced to phosphorus. For this purpose, the fluidized mass of phosphate rock in the cracking zone is heated by the introduced inert solids to a temperature which is not substantially higher than about 2000° F. In general, however, temperatures between about 1200° F. and about 2000° F. are preferably employed in the cracking zone for effecting the cracking of the fluid hydrocarbon and to deposit carbon on the phosphate rock particles. The most effective results, from an economic standpoint, are obtained by the cracking of the fluid hydrocarbon at temperatures between about 1750° F. and about 1850° F.

In carrying out the subsequent reduction treatment, the cracked phosphate rock particles in a fluidized state, are brought into contact with the preheaded inert solids which are introduced into the reduction zone. These preheated inert solids are first brought to such temperatures as would be sufficient to heat the coated phosphate rock to a temperature which is substantially higher than the cracking temperature, and at which the coated phosphate rock particles would otherwise coalesce, but for the coating of carbon thereon, to produce elemental phosphorus as a product of the process. In order, therefore, to effect the aforementioned reduction of the coated rock particles, the fluidized mass in the reduction zone is preferably heated by the inert solids to temperatures between about 2050° F. and about 2600° F. The most effective results from an economic standpoint, are obtained by carrying out the reduction treatment at temperatures between about 2150° F. and about 2400° F. Insofar as the amount of heat which is required to preheat the inert solids is concerned, temperatures in excess of that desired to be obtained in both the reduction zone (into which the inert solids are introduced) and the cracking zone (into which the solids transferred from the reduction zone are introduced) are required. In general, however, it is sufficient to preheat the inert solids, prior to their introduction into the reduction zone, to temperatures from about 200° F. to about 600° F. in excess of the temperature which is desired to be maintained in the reduction zone. Such excess heating of the inert solids over the temperature desired to be maintained in the reduction zone is sufficient to enable satisfactory reduction of the coated particles to take place in the reduction zone, and is also sufficient to permit the solids transferred from the reduction zone to possess sufficient residual heat in excess of the temperature requirements in the pyrolysis zone, to maintain the fluidized mass of phosphate rock at the desired temperature which is effective to cause cracking of the fluid hydrocarbon with the deposition of carbon on the rock particles. Thus, for practical purposes, the inert solids, prior to their introduction into the reduction zone, may be heated to a temperature within the general range from about 2250° F. to about 3200° F. and preferably between about 2350° F. and about 3000° F., to provide the desired temperature requirements in the respective reduction and cracking zones.

The inert solids that are employed for maintaining the heat requirements in the reduction zone, are preferably coarser and/or of greater density than the phosphate rock particles which are subjected to treatment. Suitable materials for use as inert solids in the present process may comprise silicon carbide, silicon nitride, silica, fused alumina, corundum, mullite and graphite. In general, the inert solid particles may be of as large a diameter as may be desired and still be able to maintain proper fluidization conditions in the cracking and reduction zones. The pressure which is maintained in both the cracking and the reduction zones is preferably between about 0 to about 20 p.s.i.g. The actual operating conditions employed will, of course, be dependent on many factors and may vary widely from the ranges, indicated above, without departing from the scope of the invention.

The phosphate rock, which is employed as the starting material, may comprise ordinary phosphate rock, and the phosphorus contained therein will normally be in the form of fluorapitite, $Ca_{10}(PO_4)_6F_2$. The phosphate rock will usually contain substantial quantities of silica, which is normally in the form of silicon dioxide. It may also contain varying quantities of other substances, such as aluminum oxide. Suitable phosphate rock is found, for example, in certain parts of Florida, Tennessee and Idaho, as well as in various other locations. The phosphate rock, which is employed in the process of the present invention, should be of a range of particle sizes suitable for fluidization, so that the process may be carried out by maintaining fluidized beds in the respective cracking and reduction zones. Particles having an average diameter from about 30 microns to about ¼ inch, more usually, between about 100 to about 150 mesh, are normally preferred. However, rock particles of other sizes which can be subjected to fluidization may also be employed without departing from the scope of the invention. The hydrocarbon which is employed for carrying out the cracking operation, as indicated above, is in the fluid state, i.e., it may be any gaseous or liquid hydrocarbon. Preferably, the hydrocarbon is employed in the form of a normally gaseous hydrocarbon or a gaseous material such as natural gas, containing substantial quantities of one or more normally gaseous hydrocarbons. The fluidizing gas employed in the reduction zone may comprise nitrogen, hydrogen and mixtures of hydrogen and methane.

In a preferred embodiment of the invention, the fluidized bed in the cracking zone preferably has a density between about 25 and about 30 pounds per cubic foot, and a superficial linear gas velocity between about 0.5 and about 2 feet per second. The density of the fluid bed in the reduction zone is preferably between about 25 and about 35 pounds per cubic foot, and the superficial linear gas velocity is preferably between about 0.4 and about 2 feet per second. The average residence time of the fluid hydrocarbon in the cracking zone is preferably between about 10 and about 60 seconds, while the residence time of the coated phosphate rock particles in the reduction zone is preferably between about 1 and about 8 hours, when the preferred temperatures are employed. In general, it is preferred to preheat the fluid hydrocarbon, usually to about 1000° F., before being introduced into the cracking zone. It will be understood, of course, that the velocities, densities and residence times, stated above, may be employed outside of the preferred ranges, without departing from the scope of the invention. If desired, additional gas, or other fluidizing media, may be injected into the system, wherever necessary, to aid in transporting the fluidized material within the process, or as a fluidizing or stripping gas.

The operating conditions described above are such as will result in obtaining a high degree of cracking of the fluid hydrocarbon in the cracking or pyrolysis zone, with substantially no reduction of the phosphate rock particles taking place within this zone. The particles of phosphate rock which thus become coated with carbon, are then transferred to the reduction zone, where the above-described conditions are adapted for the efficient reduction of the phosphate rock, employing the deposited carbon as the reducing agent. It has been found that by producing carbon, within the cracking zone, and allowing it to become deposited on the individual particles of the phosphate rock, as described above, there is little or no tendency for the rock particles to agglomerate or stick. In this connection, it will be noted that if the particles of phosphate rock would otherwise tend to agglomerate, the equipment would become completely fouled by slag and would be incapable of operating for any substantial length of time. Particles of phosphate rock, which are not coated with carbon, have been found to exhibit a strong tendency to coalesce at the above-mentioned reduction temperatures. In order to insure that agglomeration or sticking of the phosphate rock particles does not take place, it is preferred to operate the process under conditions such that carbon is produced in some excess of the amount actually required to be deposited for complete reduction to take place of the calcium phosphate to phosphorus and carbon monoxide.

Theoretically, the reaction which is carried out in the reduction zone may be represented as follows:

$$Ca_3(PO_4)_2 + 5C \rightarrow 3CaO + P_2 + 5CO$$

However, it is believed that the presence of the silica in the phosphate rock fluxes the rock particles so that the actual reaction which probably takes place may be represented as follows:

$$Ca_3(PO_4)_2 + 3SiO_2 + 5C \rightarrow 3(CaO \cdot SiO_2) + P_2 + 5CO$$

The above reactions have only been indicated for purposes of explanation, and it should be understood that the process of the present invention is not necessarily limited to those systems in which the above reaction takes place.

As was indicated above, the raw phosphate rock material usually contains silica. With this in mind, it is preferred that the ratio of silica to calcium oxide present in the phosphate rock particles in the reduction zone be between about 0.9 and about 1.1 by weight. If the phosphate rock particles do not contain sufficient silica, in the ratios indicated above, it may be advantageous to add additional silica, in any suitable form, e.g., silicon dioxide, with the phosphate rock particles in suitable quantities.

In accordance with one modification of the process of the present invention as indicated above, a gaseous product which comprises phosphate rock and flue gas is withdrawn from the cracking zone. This flue gas usually comprises hydrogen and carbon monoxide. It is therefore possible, if so desired, to separate such flue gas from the phosphate rock, and thereafter employ this separated gas as a source of heat for preheating the inert solids introduced into the reduction zone. In such instances, it is preferred to preheat the inert solids or "shot" in a downflow furnace into which air and flue gas are introduced as a combustion-supporting medium.

In accordance with another modification of the process of the present invention, it is possible, if so desired, to introduce the mass of finely divided phosphate rock into the cracking zone together with a first portion of a fluid hydrocarbon as a carrier and as an additional source for carbon production. Thereafter, a second portion of the fluid hydrocarbon may be flowed upwardly into the cracking zone to maintain the phosphate rock in a fluidized condition and also as a primary source for depositing carbon on the rock particles. In still a third modification, it is possible to combine the above-described two modifications in which flue gas is employed as a source for heating inert solids and the fluid hydrocarbon is employed in a dual purpose of acting as a carrier and also as a source for depositing carbon upon the rock particles.

For a better understanding of the process of the present invention, reference is had to the accompanying drawing which is a diagrammatic illustration, in which equipment is shown in elevation of a suitable arrangement for carrying out a preferred embodiment of the invention.

In the drawing, solid feed material is introduced into the system through conduit 11 into a hopper 12, thence through valve 13 and into conduit 14. This solid feed material comprises phosphate rock particles to which silica has been added. This feed material has the composition shown in Table I. In Table I, the elements present have been assumed, for convenience, to be chemically combined as shown, since such chemical combinations necessarily represent the actual combinations present in all feed materials. Thus, for example, although phosphorus is represented as being present in the combined form of phosphorus pentoxide, it may actually be present in the combined form of calcium phosphate.

TABLE I

*Composition of the Solid Feed*

| Component: | Weight percent |
|---|---|
| $P_2O_5$ | 24.9 |
| CaO | 35.1 |
| $SiO_2$ | 28.0 |
| $Fe_2O_3$ | 5.1 |
| $Al_2O_3$ | 3.7 |
| F | 2.3 |
| Ignition loss | 0.9 |
| | 100.0 |

Prior to being introduced into hopper 12, the feed material has been reduced to a particle size in the range from about 100 to about 150 mesh, so that it may be readily fluidized in the process. The solid feed material enters the process at the rate of 90,433 pounds per hour, of which 85,935 pounds per hour are phosphate rock and 7,083 pounds per hour are added silica.

The phosphate rock and silica entering through conduit 14 is picked up by natural gas in conduit 15. The natural gas has the composition shown in Table II and enters conduit 14 through conduit 15 at the rate of 2,695 pounds per hour.

TABLE II

*Composition of Natural Gas Feed*

| Component: | Weight percent |
|---|---|
| $CH_4$ | 92.35 |
| $C_2$ hydrocarbons | 2.19 |
| $C_3$ hydrocarbons | 0.55 |
| $C_4$ hydrocarbons | 0.13 |
| $N_2$ hydrocarbons | 4.78 |
| | 100.00 |

23,500 pounds per hour (1379.6 mols per hour) of this natural gas enters conduit 16, while the remainder continues through conduit 15 to pick up the solid material from conduit 14 in a suspension. The gas containing suspended finely divided feed material in conduit 14 passes through a heat exchanger 17 where the suspension is heated to a temperature of 1200° F., and then continues through conduit 14 to a pyrolysis reactor 18, which contains a reaction section 19. The feed material entering reactor 18 through conduit 14 is maintained in a fluidized bed in reaction section 19 as a lower dense phase in a pseudo-liquid condition and an upper dilute phase with an interface 20 between them. The feed material from conduit 14 enters the dense phase of the fluid bed at the bottom of reaction section 19 and below the interface 20. The temperature of the fluidized bed in reactor 18 is maintained at about 1800° F., while the density of the dense phase of the bed is 31.7 pounds per cubic foot (not including the shot used for heating, as described below) and the bed height is 40 feet. The material in reaction section 19 of reactor 18 is maintained in a fluidized condition by the upward flow of natural gas obtained from conduit 16 at a superficial linear gas velocity of 1.25 feet per second. Prior to being injected into the fluidized bed in reactor 18, the natural gas in conduit 16 has been heated to a temperature of 1200° F. in a heat exchanger 21. The pressure at the top of reaction section 19 of reactor 18 is maintained at 9.8 p.s.i.g., while the pressure at the bottom of the fluidized bed is 17.7 p.s.i.g. Heat is supplied to the fluidized bed in reactor 18 by the use of heated inert solids, which are introduced into reactor 18 through a distributor section 22 via a plurality of distributing pipes 23. Part of the natural gas, after having been partially cracked in reactor 18, is withdrawn from this vessel via conduit 79 and introduced into reactor 40, to serve as a fluidizing gas and as a source for additional carbon. The remaining portion of this gas is withdrawn through conduit 80 for use at a heat exchange medium in heat exchanger 17, and also as a fuel for burners 29 and 82. After being introduced into the reaction section 19 of reactor 18, and after the cracking operation has taken place, the hot inert solid material (or "hot-shot") passes through the fluidized bed and is separated at the bottom of reactor 18 in section 24. The pressure within the fluidization zone is maintained at 17.7 p.s.i.g., while the pressure at the point where the spent inert solids leave the reaction section is at 22.0 p.s.i.g. The spent heated inert solid material is then withdrawn from reactor 18 through conduit 25, the rate of flow being controlled by valve 27. The spent inert material is then ready for re-use. This material is next transferred via line 28 into burner 29 in which it is heated by the combustion of tail gases, introduced into burner 29 via line 30. Burners 29 and 82 are maintained at a pressure of 2.0 p.s.i.g. The equilibrium temperature in burners 29 and 82 is maintained at 2450° F., while the rate of introduction of the solid inert material via line 28 is maintained at 600,000 pounds per hour, and line 26 at 850,000 pounds per hour. Air, employed in the combustion of tail gases in burners 29 and 82 enters the process through conduit 31 at the rate of 460,688 pounds per hour. Following the combustion of the above-described tail gases, the heated inert solid material is then passed via conduits 32 and 83 with the products of combustion, into separator 33, in which the heater solid material is disengaged from the products of combustion. Separator 33 is maintained at a temperature of 2450° F. and a pressure of 1.5 p.s.i.g. The separated products of combustion are withdrawn from separator 33 via line 34.

As was indicated above, the air employed for combustion of tail gas in burners 29 and 82, enters the process through conduit 31 at the rate of 460,688 pounds per hour. Of this amount, 412,774 pounds per hour are passed, via blower 35, to burners 29 and 82, as previously described. The remaining quantity of 47,914 pounds per hour is transferred into line 36, via blower 37. Of this amount, 15,000 pounds per hour are introduced into conduit 56 for transporting the spent inert material from reactor 18 to burner 29 and 21,140 pounds per hour into conduit 81 for transporting the spent inert material from reactor 40 to burner 82. The remaining quantity of 11,774 pounds per hour continues through line 36 to be used as hereinafter described.

The average residence time of the gas in reactor 18 is about 40 seconds. The operating conditions maintained in reactor 18 are such that about 50 percent of the methane in the natural gas is cracked to produce carbon and hydrogen. The carbon thus produced adheres to the individual particles of solid material present in the reaction zone and results in these particles becoming heavily coated with carbon. Fluidized particles of solid material coated with carbon are withdrawn from reactor 18 through a standpipe 38 and are passed through valve 39 to a reduction reactor 40. 163 pounds per hour of nitrogen enters the system through conduit 41, and 117 pounds per hour of this nitrogen continues through conduit 42 and is injected into the material in standpipe 38.

In reactor 40, the fluidized phosphate rock coated with carbon is maintained at a temperature of 2200° F. for an average residence time of about 6 hours. The upper portion of reactor 40 is maintained at a pressure of 2 p.s.i.g., while the lower portion is maintained at a pressure of 4.9 p.s.i.g. Under these operating conditions, the carbon adhering to the particles of phosphate rock serves to reduce the phosphate rock to produce phosphorus. The fluid bed in reactor 40 has a lower dense phase in a pseudo-liquid condition and an upper dilute phase with an interface 43 therebetween. The dense phase of the fluidized bed in reactor 40 has a height of 20 feet and an average density of 21.2 pounds per cubic foot (not including the shot used for heating, as described below). The superficial linear gas velocity in reactor 40 is 1.5 feet per second.

The temperature of the fluidized bed in reactor 40 is maintained at the desired level by circulating the heated shot through the inert solids, similar to that described with respect to the operation of reactor 18. The shot used for such purposes comprises a suitable refractory material such as silicon carbide, silicon nitride or others previously described, and has an average diameter of about 1/16 inch. The heated shot is introduced into reactor 40 through a distributing section 44, via a plurality of distributing pipes 45. Part of this shot is subsequently transferred to distributor section 22, as previously described, via conduit 46 and the remainder is returned to burner 82 via conduit 26. The separated products of combustion are withdrawn from separator 33 via line 34, as previously described.

The gaseous product from reactor 40 is withdrawn through conduit 57 at the rate of 31,969 pounds per hour. This gaseous product is then transferred via conduit 57 into heat exchanger 21 where it is cooled to a temperature of 1200° F. From heat exchanger 21, the gaseous product material enters a conventional cyclone separator 58, in which entrained solid material is separated. The solid material recovered in cyclone separator 58 is withdrawn through conduit 59, passing through valve 60 and is returned to reactor 40 via line 41. Gaseous product material is withdrawn from cyclone separator 58 through conduit 61. This material has the composition shown in Table III.

TABLE III

Composition of Gaseous Product Material in Conduit 74

| Component: | Mol percent |
|---|---|
| $CH_4$ | 6.5 |
| $C_2$–$C_4$ hydrocarbons | 0.2 |
| $N_2$ | 1.2 |
| $P_4$ | 5.0 |
| CO | 51.2 |
| $H_2$ | 35.9 |
| | 100.0 |

From conduit 61, the product gas is transferred into a scrubber 62. In scrubber 62, this product gas is scrubbed by a spray of water introduced through line 63, to condense the phosphorus product. This cooling water is introduced into scrubber 62 at the rate of 500,000 pounds per hour and at a temperature of 149° F. Spray liquor and condensed phosphorus is withdrawn from the bottom of scrubber 62 through conduit 64 from which the phosphorus product may be separated from the water by settling action or other conventional separating means as a product of the process, and the water returned to scrubber 62.

Tail gas is withdrawn from the top of scrubber 62 through conduit 65 at a temperature of 150° F. This tail gas thus withdrawn from scrubber 62 has the composition shown in Table IV.

TABLE IV

Composition of Tail Gas in Conduit 78

| Component: | Mol percent |
|---|---|
| $CH_4$ | 5.1 |
| $C_2$–$C_4$ hydrocarbons | 0.2 |
| $N_2$ | 0.9 |
| $P_4$ | 0.1 |
| CO | 40.4 |
| $H_2$ | 28.3 |
| $H_2O$ | 25.0 |
| | 100.0 |

From conduit 65, the tail gas is passed into a gas suction vessel 66, maintained at a pressure of 0.5 p.s.i.g. This product tail gas is then withdrawn from vessel 66 through conduit 67 where it is pumped into conduit 30, via pump 68, for re-use in burners 29 and 82. The tail gas transferred through conduit 30 is passed at the rate of 31,565 pounds per hour.

The solid residue admixed with a small amount of spent inert material or shot, from reactor 40, is withdrawn from conduit 69. This material is passed through conduit 69 to a shot separator or elutriator 70. In vessel 70, elutriation is carried out by the transfer of air from conduit 36 at the rate of 11,660 pounds per hour. The flow of air is controlled by valve 71. The spent shot from vessel 70 is returned to separator 33 through conduit 72. The solid residue from vessel 70 is transferred through conduit 73 to a conventional cyclone separator 74. Cooling water is also introduced into conduit 73 via conduit 75. From separator 74, air is withdrawn through conduit 76, while slag is withdrawn through conduit 77 and is controlled by valve 78. The slag in conduit 77 has the composition shown in Table V.

TABLE V

*Composition of Slag in Conduit 21*

| Component: | Weight percent |
|---|---|
| $P_2O_5$ | 2.8 |
| CaO, $SiO_2$ | 81.9 |
| $Al_2O_3$ | 6.5 |
| F | 3.0 |
| Ignition loss | 1.1 |
| Fe | 3.4 |
| C | 1.3 |
| | 100.0 |

It should be understood that the Tables I through V do not in all cases represent the exact chemical compounds present. In some instances, as previously mentioned, they are intended to represent only the proportions of elements present and these elements are not necessarily chemically combined in the manner indicated.

The embodiment of the present invention shown in the drawing is not intended to be limited to the particular arrangement of apparatus shown, and may be practiced with any suitable arrangement of apparatus and under any suitable operating conditions. Additional process steps for the preparation of the materials used or for purification or other treatment of the product, may, of course, be used. It should be especially noted that the method shown for recovering the elemental phosphorus from the effluent of the reduction reactor is intended for purposes of illustration only, and that other methods may be employed without departing from the scope of the invention.

We claim:

1. A process for the production of phosphorus which comprises: flowing a fluid hydrocarbon through a cracking zone containing a mass of finely divided phosphate rock to maintain said phosphate rock in a fluidized condition; introducing preheated inert solids into said cracking zone into contact with said fluidized mass of phosphate rock to maintain said fluidized mass at a temperature effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; and in said reduction zone contacting coated phosphate rock with substantially all of the inert solids withdrawn from said cracking zone and preheated to a temperature sufficiently high to heat said coated phosphate rock to a temperature substantially higher than said cracking temperature at which said rock particles would coalesce but for said coating of carbon thereon and which is effective to reduce said coated phosphate rock to produce elemental phosphorus as a product of the process.

2. A process for the production of phosphorus which comprises: flowing a fluid hydrocarbon through a cracking zone containing a mass of finely divided phosphate rock to maintain said phosphate rock in a fluidized condition; introducing preheated inert solids into said cracking zone into contact with said fluidized mass of phosphate rock to maintain said fluidized mass at a temperature not substantially higher than about 2000° F. effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; and in said reduction zone contacting coated phosphate rock with substantially all of the inert solids withdrawn from said cracking zone and preheated to a temperaturer sufficiently high to heat said coated phosphate rock to a temperature above about 2050° F. at which said rock particles would coalesce but for said coating of carbon thereon and which is effective to reduce said coated phosphate rock to produce elemental phosphorus as a product of the process.

3. A process for the production of phosphorus which comprises: flowing a fluid hydrocarbon through a cracking zone containing a mass of finely divided phosphate rock to maintain said phosphate rock in a fluidized condition; introducing preheated inert solids into said cracking zone into contact with said fluidized mass of phosphate rock to maintain said fluidized mass at a temperature between about 1200° F. and about 2000° F. effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; and in said reduction zone contacting coated phosphate rock with substantially all of the inert solids withdrawn from said cracking zone and preheated to a temperature sufficiently high to heat said coated phosphate rock to a temperature above about 2050° F. at which said rock particles would coalesce but for said coating of carbon thereon and which is effective to reduce said coated phosphate rock to produce elemental phosphorus as a product of the process.

4. A process for the production of phosphorus which comprises: flowing a fluid hydrocarbon through a cracking zone containing a mass of finely divided phosphate rock to maintain said phosphate rock in a fluidized condition; introducing preheated inert solids into said cracking zone into contact with said fluidized mass of phosphate rock to maintain said fluidized mass at a temperature between about 1750° F. and about 1850° F. effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; and in said reduction zone contacting coated phosphate rock with substantially all of the inert solids withdrawn from said cracking zone and preheated to a temperature sufficiently high to heat said coated phosphate rock to a temperature above about 2050° F. at which said rock particles would coalesce but for said coating of carbon thereon and which is effective to reduce said coated phosphate rock to produce elemental phosphorus as a product of the process.

5. A process for the production of phosphorus which comprises: flowing a fluid hydrocarbon through a cracking zone containing a mass of finely divided phosphate rock to maintain said phosphate rock in a fluidized condition; introducing preheated inert solids into said cracking zone into contact with said fluidized mass of phosphate rock to maintain said fluidized mass at a temperature between about 1200° F. and about 2000° F. effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; and in said reduction zone contacting coated phosphate rock with substantially all of the inert solids withdrawn from said cracking zone and preheated to a temperature sufficiently high to heat said coated phosphate rock to a temperature between about 2050° F. and about 2600° F. at which said rock particles would coalesce but for said coating of carbon thereon and which is effective to reduce said coated phosphate rock to produce elemental phosphorus as a product of the process.

6. A process for the production of phosphorus which comprises: flowing a fluid hydrocarbon through a cracking zone containing a mass of finely divided phosphate rock to maintain said phosphate rock in a fluidized condition; introducing preheated inert solids into said cracking zone into contact with said fluidized mass of phosphate rock to maintain said fluidized mass at a temperature between about 1750° F. and about 1850° F. effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; and in said reduction zone contacting coated phosphate rock with substantially all of the inert solids withdrawn from said cracking zone and preheated to a temperature sufficiently high to heat said coated phosphate rock to a temperature between about 2150° F. and about 2400° F. at which said rock particles would coalesce but for said coating of carbon thereon and which is effective to reduce said coated phosphate rock to produce elemental phosphorus as a product of the process.

7. A process for the production of phosphorus which comprises: flowing a fluid hydrocarbon through a cracking zone containing a mass of finely divided phosphate rock to maintain said phosphate rock in a fluidized condition; introducing preheated inert solids into said cracking zone into contact with said fluidized mass of phosphate rock to maintain said fluidized mass at a temperature effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; in said reduction zone contacting coated phosphate rock with substantially all of the inert solids withdrawn from said cracking zone and preheated to a temperature sufficiently high to heat said coated phosphate rock to a temperature substantially higher than said cracking temperature at which said rock particles would coalesce but for said coating of carbon thereon and which is effective to reduce said coated phosphate rock to produce elemental phosphorus; withdrawing a product comprising phosphate rock and flue gas from said zone; separating flue gas from phosphate rock thus withdrawn; and employing flue gas thus separated as a source of heat for preheating said inert solids.

8. A process for the production of phosphorus which comprises: flowing a fluid hydrocarbon through a cracking zone containing a mass of finely divided phosphate rock to maintain said phosphate rock in a fluidized condition; introducing preheated inert solids into said cracking zone into contact with said fluidized mass of phosphate rock to maintain said fluidized mass at a temperature between about 1200° F. and about 2000° F. effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; in said reduction zone contacting coated phosphate rock with substantially all of the inert solids withdrawn from said cracking zone and preheated to a temperature sufficiently high to heat said coated phosphate rock to a temperature between about 2050° F. and about 2600° F. at which said rock particles would coalesce but for said coating of carbon thereon and which is effective to reduce said coated phosphate rock to produce elemental phosphorus; withdrawing a product comprising phosphate rock and flue gas from said zone; separating flue gas from phosphate rock thus withdrawn; and employing flue gas thus separated as a source of heat for preheating said inert solids.

9. A process for the production of phosphorus which comprises: introducing a mass of finely divided phosphate rock and a first portion of a fluid hydrocarbon into a cracking zone; flowing a second portion of a fluid hydrocarbon upwardly into said cracking zone to maintain said phosphate rock in a fluidized condition; introducing preheated inert solids into said cracking zone into contact with said fluidized mass of phosphate rock to maintain said fluidized mass at a temperature effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; and in said reduction zone contacting coated phosphate rock with substantially all of the inert solids withdrawn from said cracking zone and preheated to a temperature sufficiently high to heat said coated phosphate rock to a temperature substantially higher than said cracking temperature at which said rock particles would coalesce but for said coating of carbon thereon and which is effective to reduce said coated phosphate rock to produce elemental phosphorus as a product of the process.

10. A process for the production of phosphorus which comprises: introducing a mass of finely divided phosphate rock and a first portion of a fluid hydrocarbon into a cracking zone; flowing a second portion of a fluid hydrocarbon upwardly into said cracking zone to maintain said phosphate rock in a fluidized condition; introducing preheated inert solids into said cracking zone into contact with said fluidized mass of phosphate rock to maintain said fluidized mass at a temperature between about 1200° F. and about 2000° F. effective to cause cracking of said fluid hydrocarbon with deposition of carbon in said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; and in said reduction zone contacting coated phosphate rock with substantially all of the inert solids withdrawn from said cracking zone and preheated to a temperature sufficiently high to heat said coated phosphate rock to a temperature between about 2050° F. and about 2600° F. at which said rock particles would coalesce but for said coating of carbon thereon and which is effective to reduce said coated phosphate rock to produce elemental phosphorus as a product of the process.

11. A process for the production of phosphorus which comprises: introducing a mass of finely divided phosphate rock and a first portion of a fluid hydrocarbon into a cracking zone; flowing a second portion of a fluid hydrocarbon upwardly into said cracking zone to maintain said phosphate rock in a fluidized condition; introducing preheated inert solids into said cracking zone into contact with said fluidized mass of phosphate rock to maintain said fluidized mass at a temperature effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; in said reduction zone contacting coated phosphate rock with substantially all of the inert solids withdrawn from said cracking zone and preheated to a temperature sufficiently high to heat said coated phosphate rock to a temperature substantially higher than said cracking temperature at which said rock particles would coalesce but for said coating of carbon thereon and which is effective to reduce said coated phosphate rock to produce elemental phosphorus as a product of the process; withdrawing a product comprising phosphate rock and flue gas from said zone; sepaarting flue gas from phosphate rock thus withdrawn; and employing flue gas thus separated as a source of heat for preheating said inert solids.

12. A process for the production of prosphorus which comprises: introducing a mass of finely divided phosphate rock and a first portion of a fluid hydrocarbon into a cracking zone; flowing a second portion of a fluid hydrocarbon upwardly into said cracking zone to maintain said phosphate rock in a fluidized condition; introducing preheated inert solids into said cracking zone into contact with said fluidized mass of phosphate rock to maintain said fluidized mass at a temperature between about 1200° F. and about 2000° F. effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phosphate rock from said cracking zone to a reduction zone; in said reduction zone contacting coated phosphate rock with substantially all of the inert solids withdrawn from said cracking zone and preheated to a temperature sufficiently high to heat said coated phosphate rock to a temperature between about 2050° F. and about 2600° F. at which said rock particles would coalesce but for said coating of carbon thereon and which is effective to reduce said coated phosphate rock to produce elemental phosphorus as a product of the process; withdrawing a product comprising phosphate rock and flue gas from said zone; separating flue gas from phosphate rock thus withdrawn; and employing flue gas thus separated as a source of heat for preheating said inert solids.

13. A process for the production of prosphorus which comprises: introducing a mass of finely divided phosphate rock and a first portion of a fluid hydrocarbon into a cracking zone; flowing a second portion of a fluid hydrocarbon upwardly into said cracking zone to maintain said phosphate rock in a fluidized condition; introducing preheated inert solids into said cracking zone into contact with said fluidized mass of phosphate rock to maintain said fluidized mass at a temperature between about 1750° F. and about 1850° F. effective to cause cracking of said fluid hydrocarbon with deposition of carbon on said phosphate rock but below temperatures at which said phosphate rock particles coalesce and at which phosphate rock is reduced to phosphorus; separating and withdrawing inert solids from phosphate rock thus coated from said cracking zone; transferring coated phospate rock from said cracking zone to a reduction zone; in said reduction zone contacting coated phosphate rock with substantially all of the inert solids withdrawn from said cracking zone and preheated to a temperature sufficiently high to heat said coated phosphate rock to a temperature between about 2150° F. and about 2400° F. at which said rock particles would coalesce but for said coating of carbon thereon and which is effective to reduce said coated phosphate rock to produce elemental phosphorus as a product of the process; withdrawing a product comprising phosphate rock and flue gas from said zone; separating flue gas from phosphate rock thus withdrawn; and employing flue gas thus separated as a source of heat for preheating said inert solids.

References Cited in the file of this patent

UNITED STATES PATENTS

| | | |
|---|---|---|
| 1,867,239 | Waggaman et al. | July 12, 1932 |
| 2,735,743 | Rex | Feb. 21, 1956 |
| 2,967,091 | Robertson | Jan. 3, 1961 |

FOREIGN PATENTS

| | | |
|---|---|---|
| 347,937 | Great Britain | May 7, 1931 |
| 395,844 | Great Britain | July 27, 1933 |

OTHER REFERENCES

Kalbach: Article in "Chem. Eng.," January 1947, pp. 105–108.